W. C. OSTERHOLM.
CHUCK.
APPLICATION FILED JULY 20, 1912. RENEWED AUG. 23, 1913.
1,135,045.
Patented Apr. 13, 1915.
3 SHEETS—SHEET 2.
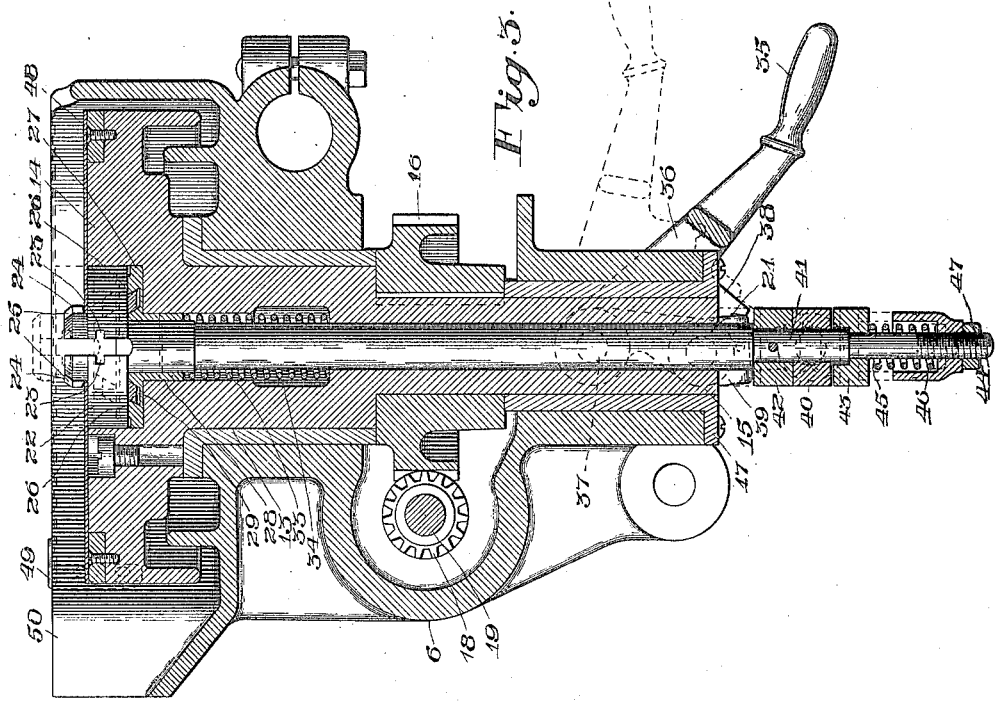
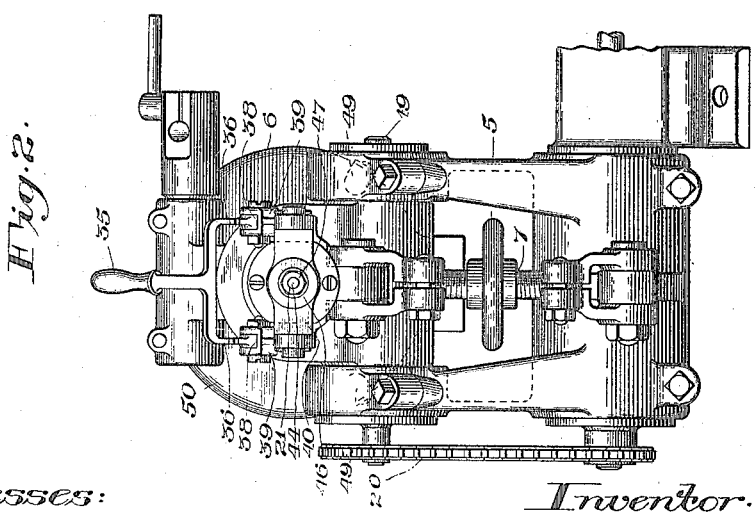
Witnesses:
F. W. Hoffmeister.
C. C. Palmer.
Inventor.
William C. Osterholm.
By E. W. Burgess
Attorney.

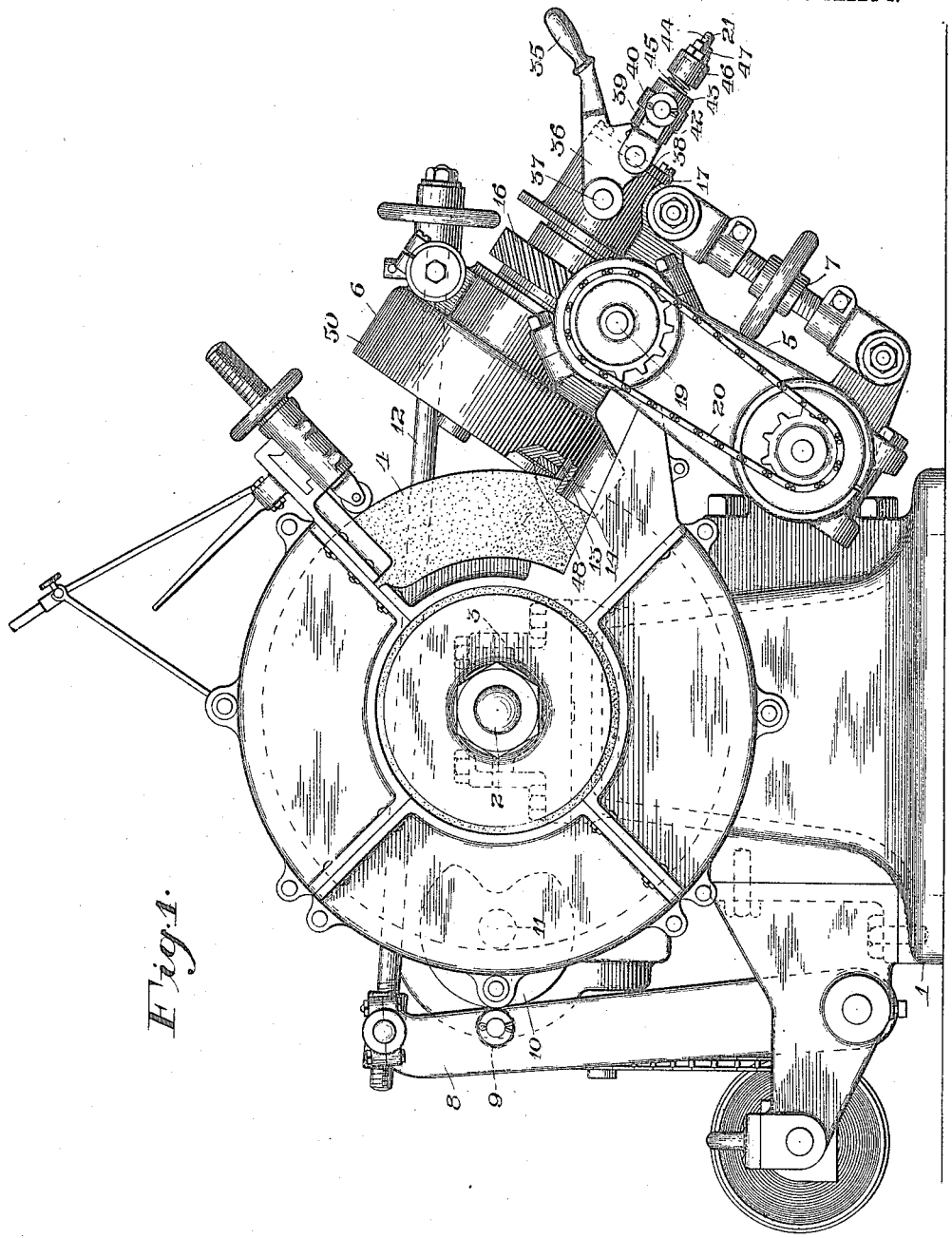

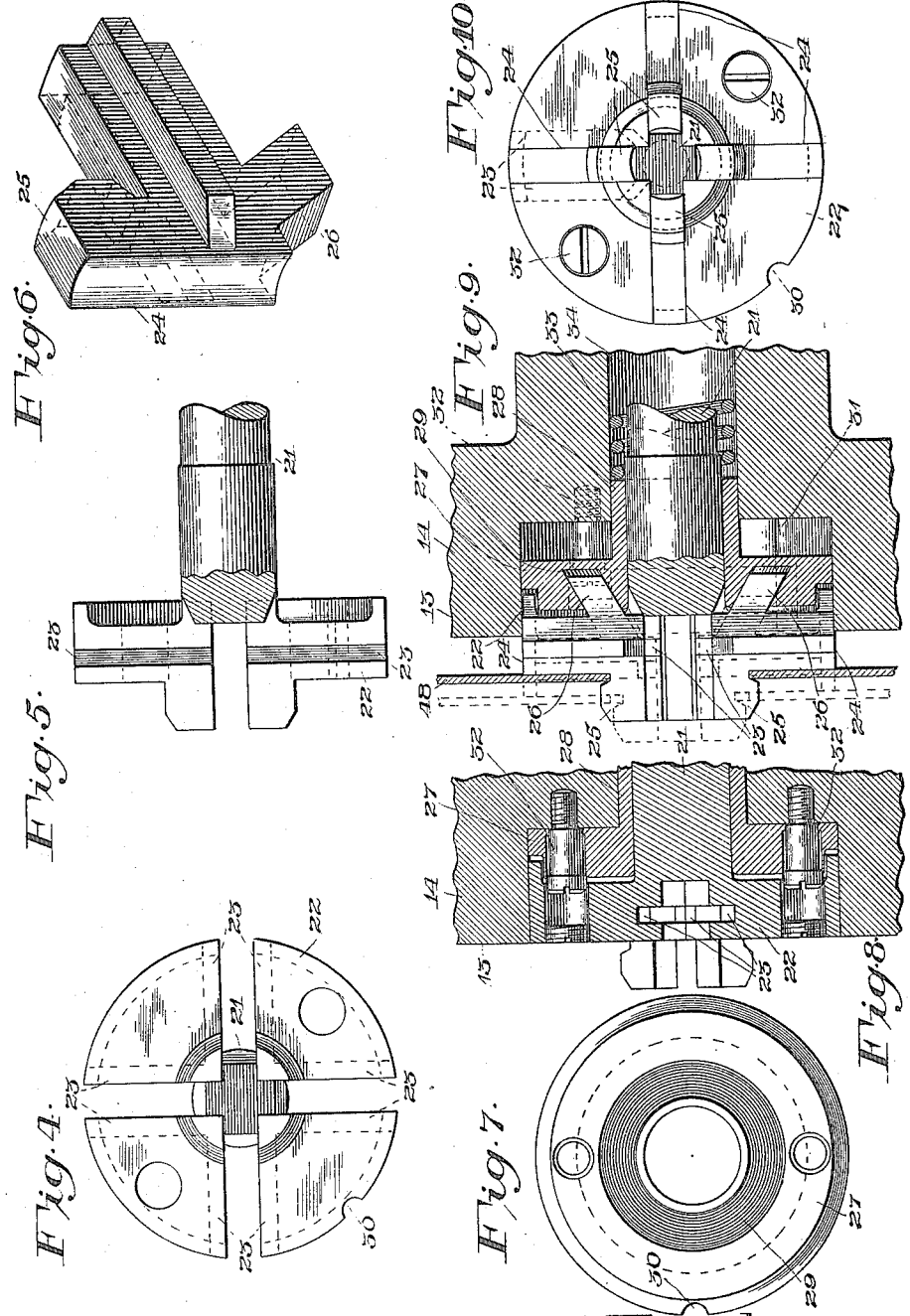

UNITED STATES PATENT OFFICE.

WILLIAM C. OSTERHOLM, OF CHICAGO, ILLINOIS, ASSIGNOR TO INTERNATIONAL HARVESTER COMPANY, A CORPORATION OF NEW JERSEY.

CHUCK.

1,135,045.  Specification of Letters Patent.  Patented Apr. 13, 1915.

Application filed July 20, 1912, Serial No. 710,544. Renewed August 23, 1913. Serial No. 786,349.

*To all whom it may concern:*

Be it known that I, WILLIAM C. OSTERHOLM, a citizen of the United States, residing at Chicago, in the county of Cook and State of Illinois, have invented certain new and useful Improvements in Chucks, of which the following is a specification.

My invention relates to chucks in its general adaptation, and in particular to devices of that character designed to hold circular disks having axial openings therein in position upon the chuck head, whereby the disks may be caused to engage with a grinding wheel and rotate in a manner to produce accurate and interchangeable members, and consists in an improved form of radially movable jaws that grasp the article to be operated upon in an efficient and secure manner; the objects of my invention being to produce a chuck that may be easily and quickly manipulated, for securing or releasing the article, rigid in its construction, not liable to disarrangement of parts, and efficient and reliable in operation. I attain these objects by means of the mechanism illustrated by the accompanying drawings, in which—

Figure 1 is an end elevation of a grinding machine having my improved chuck embodied in its construction; Fig. 2 is a rear elevation of the chuck mechanism pivotally mounted upon the swinging chuck carrying frame; Fig. 3 is a longitudinal half section of the chuck mechanism; Fig. 4 is an end elevation of a jaw carrying member forming a detail part of the chuck mechanism; Fig. 5 is a side elevation, partly in section, of Fig. 4; Fig. 6 is a view in perspective of one of the sliding jaws; Fig. 7 is a plan view of a jaw controlling plate forming a detail part of the chuck mechanism; Fig. 8 is a cross section of part of the chuck head, having some of the members in assembled relation; Fig. 9 is a cross section of part of the chuck head, showing the manner of assembling the jaws in the carrying head and the means whereby they are caused to engage with the article to be operated upon; and Fig. 10 is a plan view of the jaw carrying member having the radial movable chuck jaws carried thereby.

The same reference numerals designate like parts throughout the several views.

1 represents the base frame of a grinding machine, having a shaft 2 journaled in bearings 3 carried thereby, and 4 represents a grinding wheel secured to the shaft.

5 represents a swinging frame having the lower end thereof pivotally connected with the base of the machine, and 6 a chuck carrying frame pivotally mounted upon the upper end of frame 5 and adjustable thereon by means of a longitudinally extensible and contractile connection 7 between the two frames, whereby the angularity of the chuck carrying frame may be adjusted relative to the swinging frame. The movement of the swinging frame is controlled by means of a yoke member 8, having the lower end thereof pivotally connected with the opposite side of the base frame and having a roller 9 journaled thereon near the opposite end thereof that engages with a cam 10 carried by a feed shaft 11, the upper end of the yoke being connected with the chuck carrying frame 6 by means of a rod 12 that is adjustable in length, whereby the position of the swinging frame 5 may be adjusted relative to the grinding wheel.

The chuck mechanism includes a head member 13, having an enlarged bearing portion 14 forming part of a hollow stem extending from the rear side thereof, that is journaled in the chuck carrying frame, and a reduced portion 15 having a spiral gear pinion 16 secured thereto, and extending beyond the pinion is journaled in a bearing 17 carried by the chuck carrying frame, and 18 represents a spiral gear pinion secured to a transversely arranged shaft 19 journaled in the chuck carrying frame coaxially with the pivotal axis thereof, the shaft being operatively connected with a moving part of the machine by means of a flexible power transmitting member 20.

21 represents a longitudinally movable bar received by the hollow stem of the chuck mechanism, and integral therewith is a jaw carrying member 22 having radially arranged slots 23 therein that receive sliding chuck jaw members 24 that are provided with angular heads 25 that project beyond the face of member 22, and tail portions 26 that are inclined laterally from the axis of the bar beyond the opposite side of member 22.

27 represents a circular jaw controlling plate having a sleeve portion 28 whereby it is slidably mounted upon the bar 21 in rear of jaw carrying member 22 and provided with an annular race 29 arranged at an angle with the axis of bar 21 and adapted to receive the tail portions 26 of the radially movable chuck jaws.

The jaw carrying member 22 and the jaw controlling plate 27 are received by a counterbore in the chuck head member 13, and are provided with keyways 30 upon the peripheries thereof that loosely receive a key 31 seated in the wall of the counterbore, whereby the two members are caused to rotate with the chuck head and permit it to slide axially within the counterbore.

32 represents set screws that are received by openings in the jaw controlling plate and are connected with the chuck head in a manner to limit a sliding movement outward of the plate.

33 represents a compression spring received by a chamber 34 in the chuck head and operative between the end wall of the chamber and the sleeve 28 of the jaw carrying member in a manner to yieldingly press the jaw controlling plate in a direction to cause the jaws carried by the member 22 to move outward in a manner to secure the piece being operated upon against the face of the chuck head.

For the purpose of manipulating the chuck controlling bar 21 there is provided a toggle mechanism including a hand lever 35 provided with legs 36 disposed upon opposite sides of the chuck carrying frame and pivotally connected therewith by means of studs 37, the legs being provided with arms 38 arranged parallel with the axis of the bar 21 and pivotally connected to one end of toggle links 39, the opposite ends of the links being pivotally connected with opposite ends of a cross head member 40 arranged upon a reduced portion 41 of the bar 21, and 42 represents a collar secured to the bar between the cross head and frame and operative to limit a sliding movement thereof toward the chuck carrying frame. Upon the opposite side of the cross head is a collar 43 slidably mounted upon a reduced portion 44 of the bar and having a short counterbore adapted to receive the end of the reduced portion 41 of the bar, the collar being yieldingly held against the cross head by means of a compression spring 45 operative between a thimble 46 and the collar, the force of the spring being regulated by means of an adjusting nut 47. When the hand lever 35 is moved toward the grinding wheel and to the position shown by dotted lines in Fig. 3, the toggle mechanism will draw the bar 21 toward the chuck head 13, carrying the jaw carrying member 22 therewith, and the spring 33 causes the jaw controlling plate 27 to follow until the set screws 32 stop a further movement of the plate, and then the jaw carrying head moves independently and the sliding jaws are moved inward by reason of their engagement with the jaw controlling plate and the disk 48 may be removed from the head.

49 represents guard clips that are secured to shields 50 that inclose the chuck head, the clips being in a position to receive the disks as they are placed in position to receive the chuck jaws and prevent an accidental engagement with the grinding wheels, it being understood that the disks are provided with axial openings that receive the chuck jaws.

What I claim as being my invention, and desire to secure by Letters Patent, is:

1. A chuck including, in combination, a rotatable head, a jaw carrying member slidable axially within said head and rotatable therewith, radially movable jaws slidably mounted upon said jaw carrying member, said jaws being provided with laterally inclined tail members, a jaw controlling plate slidably mounted upon said jaw carrying member, rotatable therewith and provided with an annular race concentric with the axis thereof and adapted to receive said tail members, and means whereby said jaw carrying member may be moved axially to a limited extent independent of said jaw controlling plate.

2. A chuck including, in combination, a rotatable head having an axial counterbore, a bar slidable axially within said head and provided with a jaw carrying member integral therewith and received by said counterbore, radially movable jaws mounted in said head, said jaws being provided with laterally inclined tail members, a jaw controlling plate slidably mounted upon said bar, rotatable therewith and provided with an annular race concentric with the axis thereof and adapted to receive said tail members, means carried by said rotatable head and operative to limit a sliding movement of said jaw controlling plate relative to said head, and a hand lever mounted upon a fixed part of the mechanism and operative to move said bar in opposite directions.

3. A chuck including, in combination, a carrying frame, a rotatable hollow head journaled in said frame and having an axial counterbore upon the face thereof, a bar slidable axially within the hollow of said head and provided with a jaw carrying member at one end thereof that is slidably received within said counterbore and rotatable with said head, radially movable jaws mounted in said head, said jaws being provided with laterally inclined tail members, a jaw controlling plate slidably mounted upon said bar, rotatable therewith and provided with an annular race concentric with the axis thereof and adapted to receive said tail members, set screws received by openings in said plate, secured to said head and operative to limit a sliding movement of said plate relative to said head, a hand lever mounted upon said frame, a toggle connection between said hand lever and the opposite end of said bar and operative to control a sliding movement thereof in opposite directions.

4. A chuck including, in combination, a carrying frame, a rotatable hollow head journaled in said frame and having an axial counterbore upon the face thereof, a bar slidable axially within the hollow of said head, rotatable therewith and provided with a jaw carrying member at one end thereof that is slidably received within said counterbore, radially movable jaws mounted in said head, said jaws being provided with laterally inclined tail members, a jaw controlling plate slidably mounted upon said bar, rotatable therewith and provided with an annular race concentric with the axis thereof and adapted to receive said tail members, means for limiting a sliding movement of said plate relative to said head, a compression spring within the hollow of said head and operative to yieldingly resist a sliding movement of said plate in one direction, a collar secured to said bar and operative to limit a longitudinal movement thereof in one direction relative to said head, a hand lever pivotally mounted upon said frame and including arms upon opposite sides thereof, a cross head slidably mounted upon said bar and having opposite ends thereof pivotally connected with said arms by means of toggle members, and a compression spring carried by said bar and operative to resist the movement of said cross head thereon.

5. A chuck including, in combination, a head, a jaw carrying member movable within said head, jaws movably mounted in said jaw carrying member, a jaw controlling member, and means for causing a relative actuation of said jaw carrying and controlling members to actuate said jaws.

6. A chuck including, in combination, a jaw carrying member, jaws movably mounted therein, a jaw controlling member, and means whereby said jaws and jaw carrying and controlling members first are moved in the same direction, then motion of one of said members is arrested while the other member and said jaws continue to move to place said jaws in a releasing position.

7. A chuck including, in combination, jaws, members in which said jaws are slidably mounted, means for giving one of said members an initial movement, and means for giving another of said members a continued movement to actuate said jaws.

8. A chuck including, in combination, jaws, members in which said jaws are slidably mounted, means for giving one of said members an initial movement, and means for giving another of said members a continued movement to shift said jaws into releasing position.

9. A chuck including, in combination, jaws, members in which said jaws are slidably mounted, means for giving one of said members an initial movement, and means for giving another of said members a continued movement to shift said jaws into releasing position and to a locking position.

WILLIAM C. OSTERHOLM.

Witnesses:
WILLIAM CLARK,
CHRISTIAN S. CASPERSON.

Copies of this patent may be obtained for five cents each, by addressing the "Commissioner of Patents, Washington, D. C."